United States Patent
Sun et al.

(10) Patent No.: US 10,160,890 B2
(45) Date of Patent: Dec. 25, 2018

(54) METHOD OF PREPARING A WATER-BASED ADHESIVE WITH HIGH BINDING PROPERTY BASED ON POLYMER COMPOSITES

(71) Applicant: JILIN UNIVERSITY, Changchun (CN)

(72) Inventors: Junqi Sun, Changchun (CN); Zilin Wang, Changchun (CN); Xiang Li, Changchun (CN); Yang Li, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 34 days.

(21) Appl. No.: 15/396,692

(22) Filed: Jan. 2, 2017

(65) Prior Publication Data

US 2017/0190941 A1    Jul. 6, 2017

(30) Foreign Application Priority Data

Jan. 5, 2016    (CN) .......................... 2016 1 0004475

(51) Int. Cl.

| | |
|---|---|
| *C08J 3/05* | (2006.01) |
| *C09J 133/02* | (2006.01) |
| *C09J 139/06* | (2006.01) |
| *C09J 129/04* | (2006.01) |
| *C09J 105/08* | (2006.01) |
| *C09J 133/12* | (2006.01) |
| *C08J 3/215* | (2006.01) |
| *C08K 3/04* | (2006.01) |
| *C08L 1/02* | (2006.01) |
| *C08L 29/04* | (2006.01) |
| *C08L 71/02* | (2006.01) |
| *C08K 3/34* | (2006.01) |

(52) U.S. Cl.
CPC ............... *C09J 133/02* (2013.01); *C08J 3/05* (2013.01); *C08J 3/215* (2013.01); *C08K 3/04* (2013.01); *C08L 1/02* (2013.01); *C08L 29/04* (2013.01); *C08L 71/02* (2013.01); *C09J 105/08* (2013.01); *C09J 129/04* (2013.01); *C09J 133/12* (2013.01); *C09J 139/06* (2013.01); *C08J 2300/14* (2013.01); *C08K 3/041* (2017.05); *C08K 3/042* (2017.05); *C08K 3/346* (2013.01); *C08K 2201/011* (2013.01)

(58) Field of Classification Search
CPC ..... C08J 3/05; C08J 3/215; C08K 3/04; C09J 105/08; C09J 129/04; C09J 133/02; C09J 133/12; C09J 139/06
See application file for complete search history.

(56) References Cited

U.S. PATENT DOCUMENTS

2015/0197660 A1* 7/2015 Ronne ..................... C08J 3/05
                                                            524/432

\* cited by examiner

*Primary Examiner* — Edward J Cain
(74) *Attorney, Agent, or Firm* — JMB Davis Ben-David

(57) ABSTRACT

A method of preparing a water-based adhesive with high binding property based on polymer composites is provided, belonging to the technical field of preparation of water-based adhesives. The present invention specifically relates to a method of forming a polymer composite by blending solutions and then preparing the water-based adhesive with high binding property. The preparation method of the present invention is simple, obtaining the composite polymer hydrogel merely by blending solutions, with the dense water-based adhesive produced by centrifugation. This water-based adhesive is formed based on multiple weak interactions among the polymers, with the forming process simple and efficient and involving no sophisticated instruments and equipment; no organic solvent needs to be added in the preparation process, odor free, non-toxic and environment-protective, and common raw materials are used that are inexpensive. This water-based adhesive can be used for bonding glass, metal, wood, plastic and other various materials, and has high binding strength, allowing the materials (except plastic) to be bonded directly without surface pretreatment or modification. It is expected that the water-based adhesive prepared by the present invention will be applied in a wide range of fields.

16 Claims, 3 Drawing Sheets

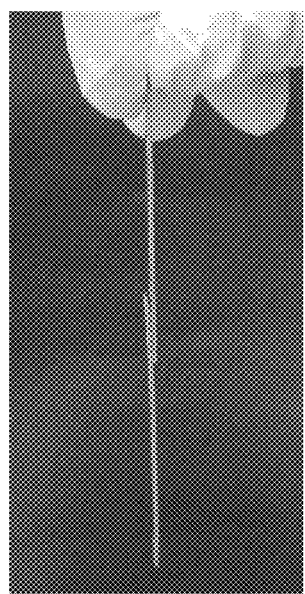
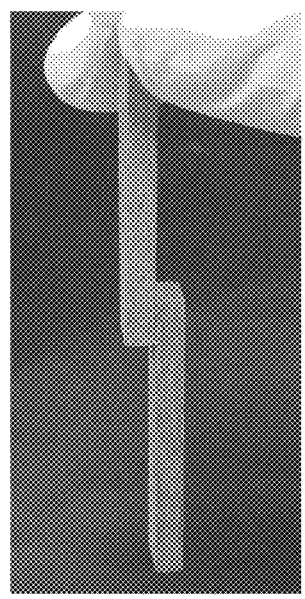
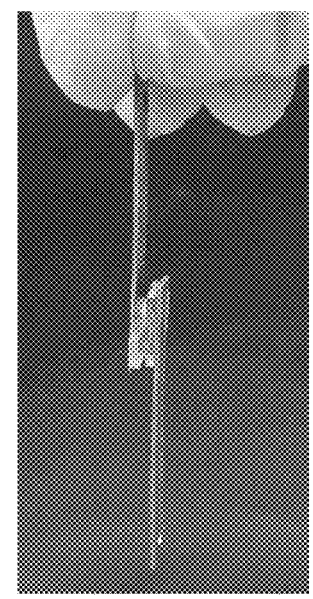
Figure 3     Figure 4     Figure 5
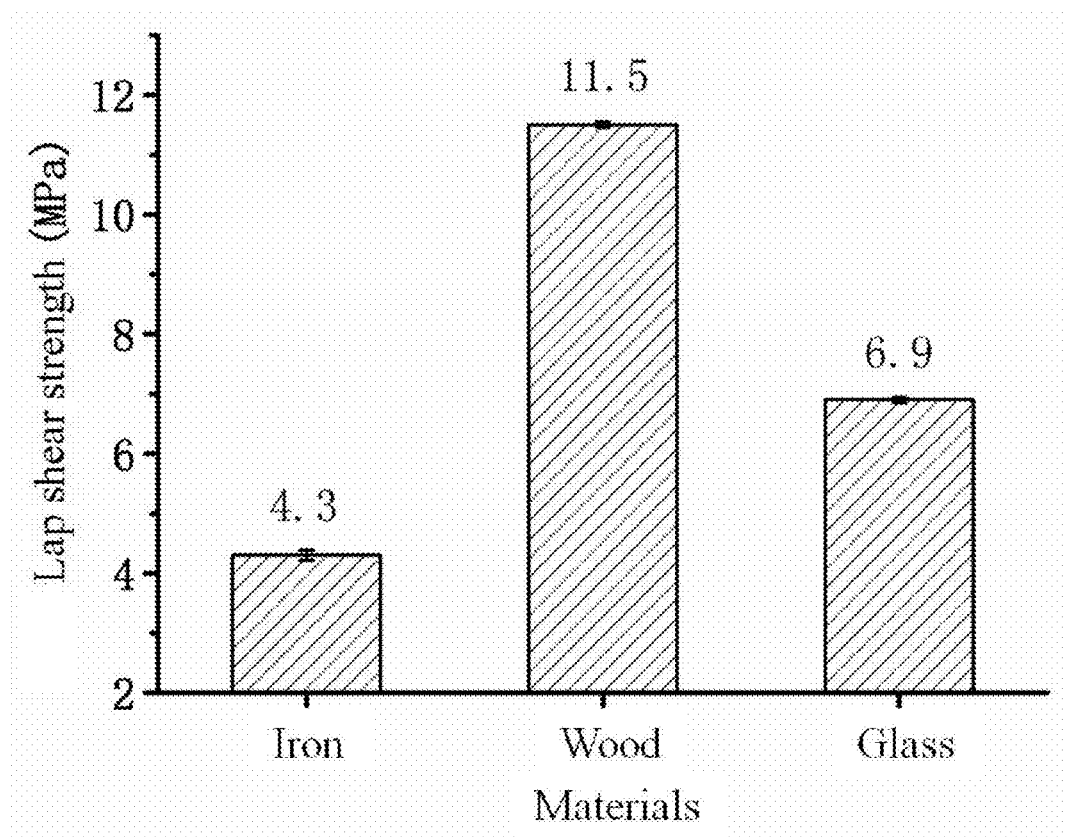
Figure 6

METHOD OF PREPARING A WATER-BASED ADHESIVE WITH HIGH BINDING PROPERTY BASED ON POLYMER COMPOSITES

CROSS REFERENCE TO RELATED APPLICATIONS

Benefit is claimed to Chinese Patent Application No. CN 201610004475.7, filed on 5 Jan. 2016, the contents of which are incorporated by reference in their entirety herein.

FIELD OF THE INVENTION

The present invention belongs to the technical field of preparation of water-based adhesives, in particular to a method of forming a polymer composite by blending solutions and then preparing the water-based adhesive with high binding property. This water-based adhesive can be applied to the surface of various materials such as glass, metal, wood, plastic or the like, having strong bonding strength for various materials.

BACKGROUND OF THE INVENTION

The adhesive made from film-forming materials that can be dispersed or dissolved in water is a water-based adhesive, also usually called an aqueous adhesive. With the film-forming materials generally being of organic polymers, gelatin, starch, dextrin, serum protein, albumin, methyl cellulose and polyvinyl alcohol all fall into this category of adhesives, together with soluble intermediates of some phenolic resins and urea-formaldehyde resins.

Not simply substituting water as a dispersion medium in the water-based adhesive for the solvent in the solvent-based adhesive, the water-based adhesive is different from the solvent-based adhesive mainly in the following aspects: The solvent-based adhesive, having a continuous phase, is a homogeneous system with organic solvents such as benzene and toluene as a dispersion medium, while the water-based adhesive is a heterogeneous system with water as the dispersion medium; the solvent-based adhesive has less molecular weight to keep coatability, while the viscosity of the water-based adhesive is independent of the molecular weight, not changing significantly with the molecular weight of the polymers, such that the molecular weight of the polymers can be greater to improve the cohesive strength of the adhesive.

Bonding strength is not only an important parameter of evaluating the quality of an adhesive, but also the almost only basis at present for judging whether a bonded joint is reliable. In order to quantitatively characterize strength of an adhesive, a specific method is needed to do a test on it. Among a lot of strength characterization methods, the lap shear test is applied most commonly: Applying the adhesive to one end of the material to be bonded, and overlaying the material with another material to be bonded in parallel to make the two materials bonded in parallel, with the bonding area being S; then doing a tensile test with a tensile tester to find out the maximum force $F_{max}$ at break. The lap shear strength (unit: Pa, generally kPa or MPa) can be calculated by dividing the maximum force $F_{max}$ by the bonding area S, i.e. $F_{max}/S$, with the bonding strength of the adhesive measurable by comparing the lap shear strength. (A waja F.; Gilbert M.; Kelly G.; et al. Adhesion of polymers [j]. *Prog Polym Sci.* 2009, 34: 948)

The polymer composites are supramolecular aggregates formed based on intermolecular weak interactions such as electrostatic interaction, hydrogen bonds, coordination bonds, and host-guest interaction. The polymer composites mainly include polyelectrolyte-polyelectrolyte composites formed by polyanions and polycations, uncharged polymer-polymer composites, polymer-surfactant molecular composites, polymer-inorganic composites, and the like.

With the polymers being mixed under nonstoichiometric conditions, the formed composites are rich in remaining sites for interacting on the surface. Compared with the non-composite polymer, the polymer composite has a relatively large size and richer composition, and the structure of the polymer composite in the solution can be adjusted and controlled by changing the composite ratio of the polymer composite, temperature, pH of the solution, ionic strength, and other parameters.

SUMMARY OF THE INVENTION

A purpose of the present invention is to provide a method of preparing a water-based adhesive with high binding property based on polymer composites. This method of preparing the water-based adhesive is simple, obtaining the composite polymer hydrogel merely by blending solutions, with the dense water-based adhesive produced by centrifugation. This water-based adhesive is formed based on multiple weak interactions among the polymers, with the forming process simple and efficient and involving no sophisticated instruments and equipment; besides, no organic solvent needs to be added in the preparation process, odor free, non-toxic and environment-protective, and the raw materials used are common and inexpensive. This water-based adhesive can be used for bonding glass, metal, wood, plastic and other various materials, and has high binding strength, allowing the materials (except plastic) to be bonded directly without surface pretreatment or modification. It is expected that the water-based adhesive prepared by the present invention will be applied in a wide range of fields.

The method of the present invention comprises the following steps:

(1) Preparation of a building solution: Dissolving the polymer in deionized water, treating with ultrasound for 20-60 minutes, and heating until complete dissolution, thus forming a polymer solution at a concentration of 1.0-10.0 mg/mL, with the pH value adjusted to 1-8 with 0.5-2 M hydrochloric acid or sodium hydroxide aqueous solution; and then dissolving the nanofiller in the deionized water, treating with ultrasound for 20-60 minutes, and heating until complete dissolution, thus forming a nanofiller solution at a concentration of 0.01-1 mg/mL;

(2) preparation of the polymer composite solution: mixing the polymer solution and the nanofiller solution together that are obtained in the step (1) at a certain dripping rate (1-10 mL/min), with the mass of the nanofiller being 0-5% of the total mass of the polymer; sufficiently stirring the polymer composite solution in the above-described mixing process, so as to prevent materials from being heterogeneously compounded due to excessive local concentration; and (3) collection of the water-based adhesive: standing the polymer composite solution obtained in the step (2) to precipitate hydrogel sufficiently, centrifugating to make the hydrogel effect of the polymer composite more strong and the structure more dense, and discarding the supernatant to obtain the water-based adhesive with high binding property.

The polymer according to the present invention is a combination of any two or more substances selected from a group consisting of hyaluronic acid, polymethacrylic acid, polyacrylic acid, polyethylene glycol, polyvinyl alcohol, polyvinyl pyrrolidone, and polyvinyl pyridine; when the polymer used is a combination of two polymers, the mass ratio of them is 1:10 to 10:1.

The nanofiller according to the present invention is one substance selected from a group consisting of graphene oxide, carbon nanotubes, montmorillonite and cellulose nanocrystals, with the grain size at 10-50 nanometers.

Compared with the prior art, the present invention has the following advantages:

1. The process is simple, the raw materials are easily available, and the cost is low;
2. the materials used are nonpoisonous, involve no organic solvents, and are environment-protective; and
3. the adhesive can be used to bond various base materials, such as glass, metal (e.g., iron and aluminum), wood (including wood furniture materials) or hydrophilically-modified plastic (e.g., plexiglass and PTFE materials), with most of the base materials allowing direct bonding without treatment or modification.

The present invention prepares the polymer composite based on the multiple weak interactions among polymers, thus producing the water-based adhesive with high binding property. The method of preparing the polymer composite used in the present invention does not need complicated instruments and raw materials, has a simple and efficient preparation process, does not need organic solvents, is nonpoisonous and environment-protective, and uses common raw materials that are inexpensive. This water-based adhesive can be used on various materials, allowing the materials (except plastic) to be bonded directly without surface pretreatment or modification, having high binding strength after being dried. With a quick and easy way of preparation utilized in the present invention, the produced water-based adhesive is nonpoisonous and environment-protective and has high binding property, expected to be applied in a wide range of fields.

BRIEF DESCRIPTION OF THE DRAWINGS

FIG. 3: a photo of the state of the water-based adhesive prepared based on the polymer composite that bonds two pieces of iron together, applicable to the lap shear tester, corresponding to Example 1;

FIG. 4: a photo of the state of the water-based adhesive prepared based on the polymer composite that bonds two pieces of wood together, applicable to the lap shear tester, corresponding to Example 2;

FIG. 5: a photo of the state of the water-based adhesive prepared based on the polymer composite that bonds two pieces of glass together, with two pieces of iron fixed on both sides of the bonded glass sample, respectively, applicable to the lap shear tester, corresponding to Example 3;

FIG. 6: a histogram of the lap shear strength of the water-based adhesive prepared based on the polymer composite that is applied to different materials, corresponding in turn to iron, wood and glass from left to right, corresponding to Examples 1, 2 and 3, respectively.

DETAILED DESCRIPTION OF THE EMBODIMENTS

The specific examples and results of the present invention will be further illustrated below through some examples, but the present invention is not limited by these examples.

Figure 1:
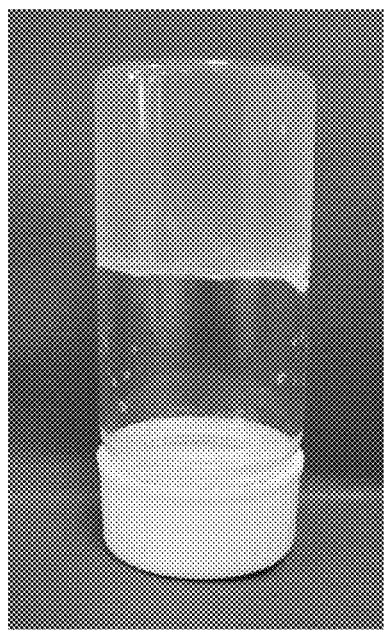
FIG. 1: a photo of the state of the water-based adhesive prepared based on the polymer composite, corresponding to Example 1.
Figure 2A:
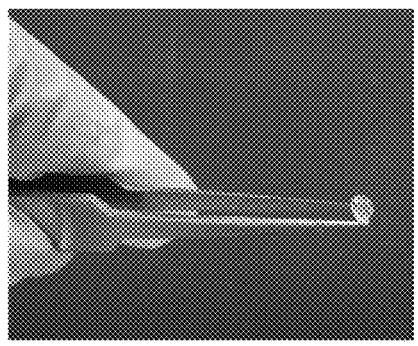
FIG. 2*a*: a photo of the state of a small piece of the water-based adhesive taken out with a forceps.
Figure 2B:
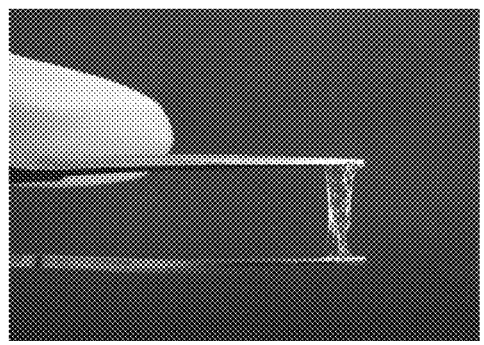
FIG. 2*b*: a photo of the state of the water-based adhesive prepared based on the polymer composite that has strong adhesion to metal at normal temperature, corresponding to Example 1.

EXAMPLE 1 a. Preparation of the building solution: Preparing 10 mL solution of polyacrylic acid (PAA) in deionized water at a concentration of 1 mg/mL and 10 mL solution of polyvinyl pyrrolidone (PVPON) in deionized water at a concentration of 1 mg/mL, respectively, with the mass ratio of the polymers contained in the two solutions being 1:1, and adjusting the pH value of the polymer solutions to 4 with 1 M HCl aqueous solution, respectively.

b. Preparation of the polymer composite: Mixing the prepared solutions at a volume ratio of 1:1 at a speed of 10 mL/min, with the polymer composite solution needing to be sufficiently stirred in the mixing process so as to prevent the heterogeneous composite from being produced due to excessive local concentration of the polymer.

c. Collection of the water-based adhesive: Standing the polymer composite solution after they are mixed to precipitate the polymer composite hydrogel sufficiently, centrifugating to achieve dense hydrogel, and discarding the supernatant to obtain the needed water-based adhesive. As shown in FIG. 1, what is located at the top of the little bottle is the water-based adhesive just obtained by centrifugation, which is translucent hydrogel that will not flow even when being placed upside down; this water-based adhesive can be easily taken out. As shown in FIG. 2*a*, a small piece of the gel can be taken out conveniently with a forceps; with the two feet of the forceps apart, it can be found that this gel has strong adhesion to the stainless steel forceps, as shown in FIG. 2*b*.

d. Bonding of samples: Removing a proper amount of the prepared water-based adhesive, as shown in FIG. 2*a*, placing it at one end of a piece of iron, and overlaying the piece of iron with another piece of iron in parallel, as shown in FIG. 3, with the bonding area being 0.5 cm×1 cm; applying pressure of 5 N to the bonded region to make the two pieces of iron contact closely, which can be bonded firmly after the water in the water-based adhesive is vaporized completely.

e. Applying these bonded pieces of iron to the lap shear tester to test the bonding strength of this water-based adhesive. The $F_{max}$ measured in this example is 215 N, and the lap shear strength $F_{max}/S$ calculated in this example when the water-based adhesive is applied to the surface of iron pieces is 4.3 MPa, as shown in FIG. 6.

EXAMPLE 2 a. Preparation of a building solution: Preparing 10 mL solution of hyaluronic acid (HA) in deionized water at a concentration of 5 mg/mL and 10 mL solution of polyvinyl alcohol (PVA) in deionized water at a concentration of 1 mg/mL, and adjusting the pH value of the polymer solutions to 7 with 1 M NaOH aqueous solution, respectively. Preparing 10 mL solution of cellulose nanocrystal (CNC) in deionized water at a concentration of 0.12 mg/mL (2% of the total mass of HA and PVA), and treating with ultrasound for 40 minutes to uniformly disperse.

b. Preparation of the polymer composite: Mixing the prepared solutions at a volume ratio of 1:1:1 at a constant dripping rate of 5 mL/min, with the polymer composite solution needing to be sufficiently stirred in the mixing process so as to prevent the heterogeneous composite from being produced due to excessive local concentration.

c. Collection of the water-based adhesive: Standing the polymer composite solution after the composites are mixed to precipitate the hydrogel sufficiently, centrifugating to achieve dense hydrogel, and discarding the supernatant to obtain the applicable water-based adhesive, with the state of this water-based adhesive similar to that of the water-based adhesive in FIG. 1.

d. Bonding of samples: Removing a proper amount of the water-based adhesive to apply to a strip of wood 1 cm wide, and overlaying this strip of wood with another strip of wood in parallel under the guarantee that the bonding area is 1 cm×1 cm and the requirement that the water-based adhesive should uniformly cover the entire bonding surface; with the sample fixed by an Elliot folder, the strip of wood can be bonded firmly after the water-based adhesive is dried, as shown in FIG. 4.

e. Applying these bonded strips of wood to the lap shear tester to test the bonding strength of this water-based adhesive. The $F_{max}$ measured in this example is 115 N, and the lap shear strength $F_{max}/S$ calculated in this example when the water-based adhesive is applied to the strip of wood is 11.5 MPa, as shown in FIG. 6.

Figure 7:
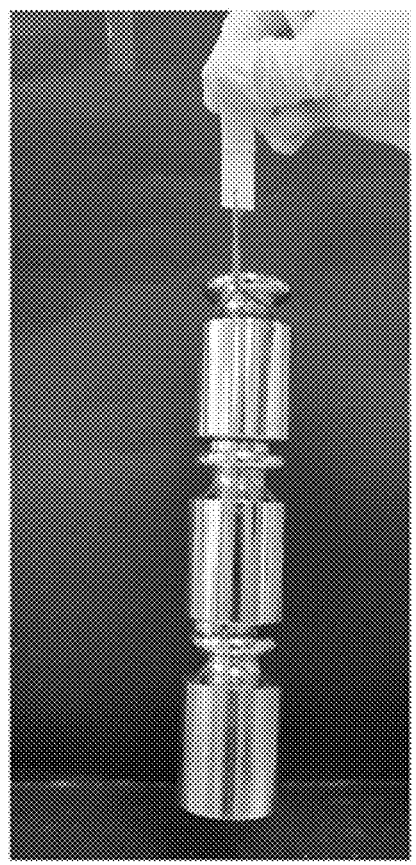
FIG. 7: two hydrophilically-modified PTFE sheets bonded by the water-based adhesive prepared based on the polymer composite, allowing three 500 g weights to be hung at the total weight about 1500 g.

EXAMPLE 3 a. Preparation of a building solution: Preparing 10 mL solution of polymethacrylic acid (PMAA) in deionized water at a concentration of 1 mg/mL and 10 mL solution of polyethylene glycol (PEG) in deionized water at a concentration of 9 mg/mL and, after dissolving completely, adjusting the pH value of the polymer solutions to 1 with 1 M HCl aqueous solution. Preparing 10 mL solution of montmorillonite (MMT) in deionized water at a concentration of 0.4 mg/mL (4% of the total mass of PMAA and PVA), and treating with ultrasound for 60 minutes to uniformly disperse.

b. Preparation of the polymer composite: Mixing the prepared solutions at a volume ratio of 1:1:1 at a constant dripping rate of 1 mL/min, with the polymer composite solution needing to be sufficiently stirred in the mixing process so as to prevent the heterogeneous composite from being produced due to excessive local concentration.

c. Collection of the water-based adhesive: Standing the polymer composite solution after the composites are mixed to precipitate the hydrogel sufficiently, centrifugating to achieve dense hydrogel, and discarding the supernatant to obtain the applicable water-based adhesive, with the state of this water-based adhesive similar to that of the water-based adhesive in FIG. 1.

d. Bonding of samples: Removing a proper amount of the water-based adhesive to apply to a piece of glass 0.5 cm wide, and overlaying this piece of glass with another piece of glass in parallel under the guarantee that the bonding area is 0.5 cm×0.5 cm and the requirement that the water-based adhesive should uniformly cover the entire bonding surface; with the sample fixed by an Elliot folder, the glass can be bonded firmly after the water-based adhesive is dried.

e. With the glass having no binding sites to have the lap shear test, the commercial cyanoacrylate glue is applied to both sides of the bonded glass sample to bond the pieces of glass and iron together, as shown in FIG. 5. Applying the bonded glass with fixed pieces of iron to the lap shear tester, and collecting the experimental data under the guarantee that the bond between the glass samples is broken, with the $F_{max}$ measured to be 172.5 N and the lap shear strength $F_{max}/S$ in this example when the water-based adhesive is applied to the surface of glass calculated to be 6.9 MPa, as shown in FIG. 6.

f. The surface of plastic materials can also be bonded with this water-based adhesive after being hydrophilically modified. As shown in FIG. 7, two hydrophilically-modified PTFE sheets (1 cm wide) are bonded with the water-based adhesive prepared by the present invention at the bonded area of 1 cm×0.7 cm, with this bonding joint able to withstand a weigh about 1500 g after the water is evaporated.

These examples indicate that the method of preparing the water-based adhesive according to the present invention is simple, convenient and fast, uses materials that are safe and nonpoisonous, has a good bonding effect and a wide application range, and thus has a broad application prospect and high business value.

What is claimed is:

1. A method of preparing a water-based adhesive with high binding property comprising the following steps:
   (1) preparation of building solutions: selecting a plurality of polymers and dissolving each polymer separately in deionized water, and treating each polymer solution with ultrasound for 20-60 minutes, and heating until complete dissolution of the polymer, thus forming a plurality of polymer solutions each at a concentration of 1.0-10.0 mg/mL, with its pH value adjusted to 1-8;
   (2) preparation of a mixed polymer solution: mixing together the plurality of polymer solutions obtained in step (1) to form a mixed polymer solution; and
   (3) collection of the water-based adhesive: centrifuging the mixed polymer solution obtained in step (2) so that a hydrogel precipitates, and a supernatant resulting from centrifugation is discarded, thereby to obtain a water-based adhesive with high binding property.

2. The method of preparing a water-based adhesive with high binding property according to claim 1, wherein each of the polymers of the plurality of polymers is a different polymer selected from a group consisting of hyaluronic acid, polymethacrylic acid, polyacrylic acid, polyethylene glycol, polyvinyl alcohol, polyvinyl pyrrolidone, and polyvinyl pyridine.

3. The method of preparing a water-based adhesive with high binding property according to claim 2, wherein the plurality of polymers used is two polymers, having a mass ratio of 1:10 to 10:1.

4. The method of preparing a water-based adhesive with high binding property according to claim 1, where in step (1), the pH value is adjusted to 1-8 with 0.5-2 M hydrochloric acid or sodium hydroxide aqueous solution.

5. The method of preparing a water-based adhesive with high binding property according to claim 1, where in step (2), the mixed polymer solution is stirred to ensure homogeneous mixing.

6. The method of preparing a water based adhesive with high binding property according to claim 1, wherein said step of selecting further includes selecting and then dissolving a nanofiller in its own deionized water treating the resulting nanofiller solution with ultrasound for 20-60 minutes, and heating until complete dissolution of the nanofiller in the deionized water, thus forming a nanofiller solution at a concentration of 0.01-1 mg/mL, and wherein said step of mixing further includes mixing said nanofiller solution with the plurality of polymer solutions thereby forming a composite solution wherein the mass of the nanofiller is 0.001-5% of the total mass of the polymers in the composite solution, and wherein said step of centrifuging is centrifuging said composite solution so that a hydrogel precipitates and a resulting supernatant is discarded.

7. The method of preparing a water-based adhesive with high binding property according to claim 6, wherein the nanofiller is a substance selected from a group consisting of graphene oxide, carbon nanotubes, montmorillonite, and cellulose nanocrystals with a grain size of 10-50 nanometers.

8. The method of preparing a water-based adhesive with high binding property according to claim 6, where in step (2), the composite solution is stirred to ensure homogeneous mixing.

9. The method of preparing a water-based adhesive solution with high binding property according to claim 6, wherein the mass of nanofiller is 2-4% of the total mass of the polymers in the composite solution.

10. A method of preparing a water-based adhesive with high binding property, comprising the following steps:
   (1) preparation of building solutions: selecting a plurality of polymers and dissolving each polymer in deionized water to form separate solutions, and treating the contents of each separate solution with ultrasound for 20-60 minutes, and heating until complete dissolution of the polymer, thus forming a plurality of polymer solutions each at a concentration of 1.0-10.0 mg/mL, with its pH value adjusted to 1-8; and dissolving a nanofiller separately in deionized water, treating the resulting nanofiller solution with ultrasound for 20-60 minutes, and heating until dissolution of the nanofiller is complete, the nanofiller in the solution having a concentration of 0.01-1 mg/mL;
   (2) preparation of a composite solution: mixing together the plurality of polymer solutions obtained in step (1) and the nanofiller solution obtained in step (1) to form a composite solution, the mass of the nanofiller being 0.001-5% of the total mass of the polymers in the composite solution; and
   (3) collection of the water-based adhesive: centrifuging the composite solution obtained in step (2) so that a hydrogel precipitates, and a supernatant resulting from the centrifugation is discarded, thereby to obtain a water-based adhesive with high binding property.

11. The method of preparing a water-based adhesive with high binding property according to claim 10, wherein each of the polymers of the plurality of polymers is a different polymer selected from a group consisting of hyaluronic acid, polymethacrylic acid, polyacrylic acid, polyethylene glycol, polyvinyl alcohol, polyvinyl pyrrolidone, and polyvinyl pyridine.

12. The method of preparing a water-based adhesive with high binding property according to claim 11, wherein the plurality of polymers used is two polymers having a mass ratio of from 1:10 to 10:1.

13. The method of preparing a water-based adhesive with high binding property according to claim 10, wherein the nanofiller is a substance selected from a group consisting of graphene oxide, carbon nanotubes, montmorillonite, and cellulose nanocrystals with a grain size of 10-50 nanometers.

14. The method of preparing a water-based adhesive with high binding property according to claim 10, where in step (1), the pH value is adjusted to 1-8 with 0.5-2 M hydrochloric acid or sodium hydroxide aqueous solution.

15. The method of preparing a water-based adhesive with high binding property according to claim 10, where in step (2), the composite solution is stirred to ensure homogenous mixing.

16. The method of preparing a water-based adhesive with high binding property according to claim 10 wherein the mass of nanofiller is 2-4% of the total mass of the polymers in the composite solution.

* * * * *